Figure 1:
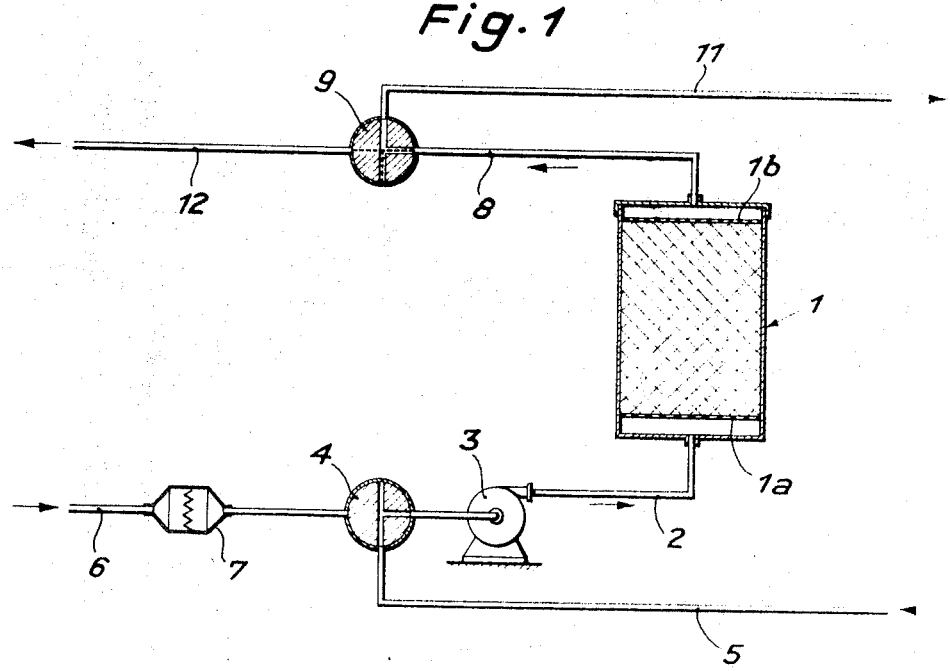

United States Patent

[11] 3,594,986

| | | | | | |
|---|---|---|---|---|---|
| [72] | Inventor | Emmerich Schmid<br>Winterthur, Switzerland | | | |
| [21] | Appl. No. | 24,659 | | | |
| [22] | Filed | Apr. 1, 1970 | | | |
| [45] | Patented | July 27, 1971 | | | |
| [73] | Assignee | Sulzer Brothers, Ltd.<br>Winterthur, Switzerland | | | |
| [32] | Priority | Apr. 17, 1969 | | | |
| [33] | | Switzerland | | | |
| [31] | | 5804 | | | |

[54] PROCESS AND APPARATUS FOR ADSORBING A GASEOUS COMPONENT FROM A GAS MIXTURE
12 Claims, 3 Drawing Figs.

[52] U.S. Cl. .................................... 55/68, 55/162
[51] Int. Cl. ....................................... B01d 53/00
[50] Field of Search .......................... 21/58; 55/26, 27, 62, 68, 74, 162, 179, 180, 387; 99/154

[56] References Cited
UNITED STATES PATENTS

| | | | |
|---|---|---|---|
| 3,203,771 | 8/1965 | Brown et al. .................. | 55/68 X |
| 3,242,651 | 3/1966 | Arnoldi ......................... | 55/68 X |
| 3,313,630 | 4/1967 | Harvey, Jr. .................... | 21/58 X |
| 3,313,631 | 4/1967 | Jensen ........................... | 21/58 X |
| 3,323,288 | 6/1967 | Cheung et al. ................ | 55/62 X |

*Primary Examiner*—Reuben Friedman
*Assistant Examiner*—R. W. Burks
*Attorney*—Kenyon, Kenyon, Reilly, Carr & Chapin ABSTRACT: The switchover valves are actuated in a predetermined timelag sequence so that the storeroom air can first push out residual desorption gas from the container and outflow conduits before being recycled after washing to the storeroom. In the same manner, during a regeneration period, the incoming fresh air initially pushes the residual storeroom air into the storeroom before being vented to the atmosphere.

3,594,986

Inventor:
EMMERICH SCHMID

PROCESS AND APPARATUS FOR ADSORBING A GASEOUS COMPONENT FROM A GAS MIXTURE

This invention relates to a process and apparatus for adsorbing a gaseous component from a gas mixture. More particularly, this invention relates to a process and apparatus for adsorbing carbon dioxide from air within a storeroom.

It has been known that the air in a storeroom for fruit, vegetables, flowers and the like must be maintained with a relatively low carbon dioxide content and that in the case of a final ripening process the carbon dioxide must be further reduced. For example, it has been known for the pure storage of fruits and the like, that by the use of a suitably controlled or regulated atmosphere and with the aid of a favorable control of carbon dioxide in the atmosphere of a cooled storeroom, it is possible to keep the fruit for a period of months.

As is well known, fruits such as apples retain their living functions even after harvesting since they consume oxygen and produce carbon dioxide. The more rapidly this "breathing process" proceeds, the quicker the fruit ages. A lengthening of this breathing process can be achieved in a storeroom by substantially reducing the oxygen content of the storeroom atmosphere in comparison with normal air, the oxygen content being reduced to about 3 percent for the storage of fruit.

In order to produce such an atmosphere which differs from the normal composition of air with respect to the oxygen content and carbon dioxide content, one known process has required the sealing of a cooled storeroom in a substantially gastight manner from the exterior so that the carbon dioxide given off by the fruit in the storeroom after adsorbing oxygen can be removed from the storeroom atmosphere by washing it out, for example, in a suitable adsorption apparatus. During the continued breathing of the stored goods, the oxygen content of the storeroom air is further consumed until a desired oxygen content of about 3 percent is reached. This oxygen content is then maintained through the introduction of outside air.

One usual method for diminishing the carbon dioxide content of storeroom air by using solid regeneratable adsorption medium requires the simultaneous switching over from an adsorption period to a following regeneration period. The equipment for carrying out such a process uses switchover valves which are installed in inflow and outflow conduits of an adsorption apparatus and which are switched over simultaneously in going from an adsorption period to a regeneration period. That is, during the adsorption period, storeroom air is conducted through the adsorption apparatus and returned into the storeroom by a blower or fan, while the inflow and outflow conduits for a gaseous desorption medium, e.g. fresh air, are obturated by the valves. At the initiation of a regeneration period, the inflow and outflow conduits for the storeroom air are closed simultaneously by means of the valves, and the path for supplying desorption medium into the adsorption apparatus and the paths for conducting this adsorption medium out of the apparatus and into the atmosphere are opened.

Such a process and apparatus however have serious drawbacks. For example, because the empty volume of the adsorption apparatus, which contains a loose filling of granulated adsorption medium, as well as the inflow and outflow conduits of the apparatus as far as the valves, contain storeroom air of reduced carbon dioxide content during the adsorption period, this quantity of storeroom air, upon simultaneous opening of the valves for the regeneration of the adsorption medium, becomes conveyed into the atmosphere through the outflow conduit. In the course of time and under certain conditions, this results in a substantial loss of quantity of storeroom air needed in the storeroom.

Further, during the switchover from a regeneration period to an adsorption period, the desorption medium contained in the aforesaid empty volume and which is enriched with oxygen, 20.8 percent of oxygen for example, when fresh air is employed, flows into the storeroom. Because of this, the oxygen content in the storeroom can rise to an unallowable degree which is detrimental to the stored goods.

Accordingly, it is an object of the invention to prevent the storage atmosphere in a storeroom from becoming altered.

It is another object of the invention to prevent a loss of treated storeroom air from a storeroom.

Briefly, the invention provides for an adsorption period during which a desorption medium contained in an empty volume of an adsorption apparatus filled with absorption medium is forced into the atmosphere by the aid of gas mixture brought in from a room. After this, the gas mixture treated in the adsorption apparatus is conducted back into the room. This is followed by a regeneration period during the initial phase of which the treated gas mixture still contained in the adsorption apparatus, is by the aid of the gaseous desorption medium forced into the room. After this, the gaseous regeneration medium, after flowing through the adsorption apparatus is conducted away into the atmosphere.

An apparatus for carrying out the invention includes suitable conduit means which are connected to the storeroom to be regulated and to a source of desorption medium such as fresh air, an adsorption means for adsorbing the gaseous component to be removed from the storeroom, and switchover valve means for selectively connecting the various conduits to the adsorption means so as to first convey the storeroom gas mixture through the adsorption means during an adsorption period and then to convey the desorption medium through the adsorption means during a subsequent regeneration period. In addition, a retardation means is provided to open and close the valve means in the conduits in a manner so that during the initial phase of the adsorption period, the storeroom gas mixture forces any residual desorption medium out of the adsorption means, for example, into the atmosphere. Thereafter, the storeroom gas mixture is returned to the storeroom through the respective return conduit in a washed state. Similarly, during the initial phase of the regeneration period, the desorption medium forces residual storeroom gas mixture into the return conduits to the storeroom. Thereafter, the desorption medium is vented to the atmosphere.

In one embodiment, the adsorption apparatus utilizes a container having an adsorption medium therein for removing a gaseous component from the storeroom gas mixture. This container is positioned so that the various gases can flow upwardly or downwardly or in any other suitable direction therethrough. In another embodiment, two such containers can be used so that while one is removing the gaseous component from the storeroom gas the other is regenerating the adsorption medium.

This retardation allows a continuous operation to be carried out without either loss of the storeroom gas mixture, except for the component to be eliminated, or inadvertent contamination of the storeroom gas mixture with the desorption medium.

The retardation means can be constructed in any suitable form such as electric, hydraulic, mechanical or pneumatic.

For example, for an electrical retardation means it is possible to use timing relays. Also, when use is made of diaphragm valves as the switchover valves, the valves can, for example, be operated by means of compressed air or some fluid medium under pressure. Further, shutters serving as retardation means can be installed in the control conduits for the valve or valves to be switched in retardedly. In the case of a mechanical switchover of the valves, the retarded switchover can be done by the aid, for example, of a lever transmission.

The invention, in its application for washing carbon dioxide out of the air in storerooms for fruits and the like, thus allows the desorption medium which is enriched with oxygen and carbon dioxide and which remains in the desorption apparatus and in its connecting conduits to be forced through the outflow conduit for the desorption medium into the atmosphere at the beginning of an adsorption period by the air brought in from the storeroom. Only then does this outflow conduit become closed by the valve associated therewith while the outflow conduit into the storeroom becomes opened, so that now nothing but storeroom air having the desired percentage of oxygen and carbon dioxide flows into the storeroom.

Furthermore, it is ensured at the initiation of the regeneration period that the quantity of storeroom air treated during the preceding adsorption period, and still remaining enriched with carbon dioxide in the empty volume, becomes forced through the outflow conduit into the atmosphere. Only then does this conduit become closed by a valve while the outflow conduit to the atmosphere becomes opened, so that now nothing but desorption medium, which has been enriched with carbon dioxide in the desorption apparatus, flows out into the atmosphere.

The adsorption means used in the apparatus of the invention can consist of a solid adsorption medium such as active carbon or zeolite. In the sense of the invention, solid adsorption mediums also include those mediums where a granulated solid material, gravel for example, forms a carrier for a liquid adsorption medium, such for example as a potash solution.

Figure 2:
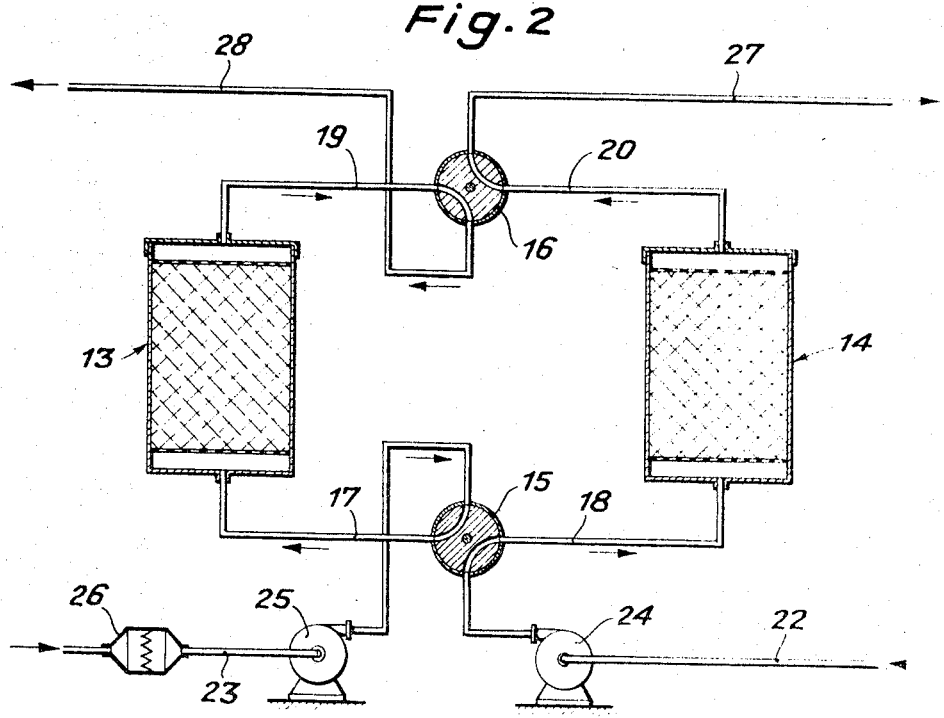
Figure 3:
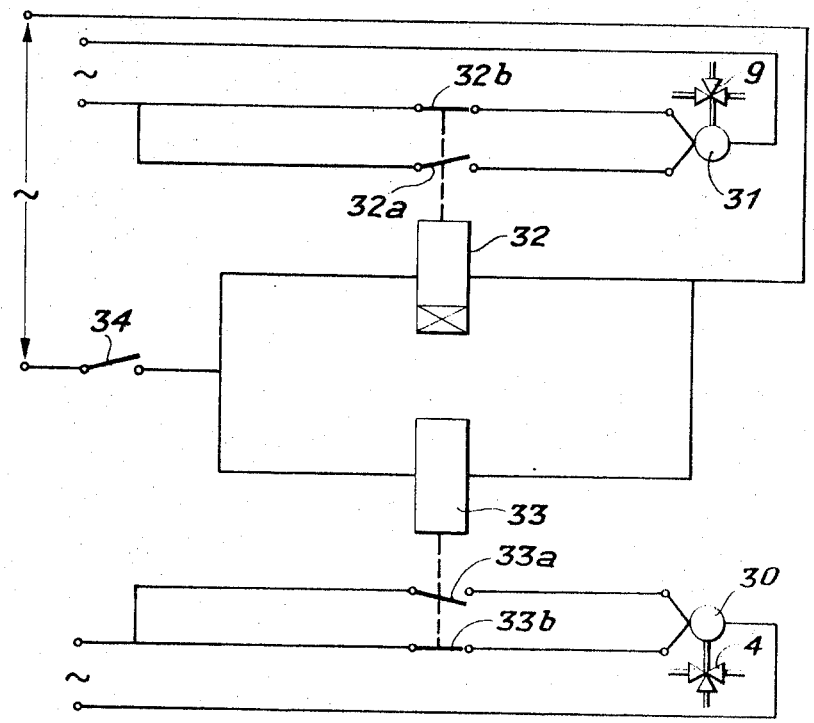

These and other objects and advantages of the invention will become more apparent from the following detailed description and appended claims taken in conjunction with the accompanying drawings in which:

FIG. 1 schematically illustrates an apparatus according to the invention;

FIG. 2 schematically illustrates an apparatus of the invention having two adsorption containers; and FIG. 3 illustrates in detail a circuit diagram for controlling the switchover valves with timing relays as the retardation means.

Referring to FIG. 1, an adsorption container 1 contains a filling, for example, of granulated active carbon which is located between two sieves or wire nettings 1a, 1b. The lower part of the adsorption container 1 is connected to an inflow conduit 2 in which a blower 3 is disposed so as to force a gas mixture or desorption gas into and through the container 1 via the conduit 2. In addition, a three-way valve 4 selectively connects to the end of the conduit 2 with a conduit 5 which leads to an enclosed room (not shown) and with a conduit 6 which leads to a source of desorption gas (now shown). The conduit 5 serves to convey a gas mixture during an adsorption period of time out of the enclosed room and into the container 1 via the valve 4, blower 3 and inlet conduit 2. The conduit 6, on the other hand, serves to convey a desorption gas, such as fresh air, during a regeneration period of time into the container via the valve 4, blower 3 and inlet conduit 2. In addition, a heating device 7 is installed in the adsorption gas conduit 6 in order to at least intermittently heat the adsorption gas prior to passage into the container 1.

The upper part of the container 1 is connected to an outflow conduit 8 in which a three-way valve 9 is installed so as to selectively connect the conduit 8 with an outflow conduit 11 which leads back into the enclosed room and with an outflow conduit 12 which leads to a suitable reservoir outside the enclosed room. The outflow conduit 11 serves to return the gas mixture drawn out of the enclosed room minus the component which is separated out in the adsorption container 1 during the adsorption period. The outflow conduit 12, on the other hand, serves to carry away the desorption gas delivered during the regeneration period.

Referring to FIG. 2, the adsorption-regeneration apparatus can alternatively be constructed with two adsorption containers 13, 14 similar to that described above. In such an embodiment, the two containers are operated simultaneously so that while desorption is being carried out in one container 13, as shown, adsorption is carried out in the other container 14. To this end, the lower part of the containers 13, 14 are connected by conduits 17, 18, respectively, to a four-way valve 15 which, in turn, is connected to a pair of inflow conduits 22, 23 which serve to convey the gas mixture from the enclosed room (not shown) and the desorption gas from a suitable supply, respectively. Each conduit 22, 23, however, has a blower 24, 25 therein to force the respective gas into the valve 15 while the desorption gas conduit 23 also has a heating device 26 therein as above. The four-way valve 15 is constructed so as to convey the gas mixture from the enclosed room via the conduits 22 and 18 to one container 14 while the desorption gas is conveyed via the conduits 23, 17 to the other container 13, as shown, during one phase while shifting in another phase to convey the gas mixture via conduits 22, 17 to the container 13 and the desorption gas via conduits 23, 18 to the container 14. In addition, the upper parts of the containers 13, 14 are connected by conduits 19, 20 respectively to a four-way valve 16 which, in turn, is connected to a pair of outflow conduits 27, 28 which serve to return the gas mixture to the enclosed room and to carry off the desorption gas. This latter valve 13 is operated so as to alternately connect the conduit 20 to one of the conduits 27, 28 while alternately connecting the conduit 19 to the conduits 28, 27. The respective valves 15, 16 are actuated so that adsorption takes place in one container while regeneration takes place in the other container in alternating manner.

In operation, the switchover of the valve 9 of FIG. 1 and the valve 16 of FIG. 2, relative to valve 4 (FIG. 1) and valve 15 (FIG. 2), during a changeover from an adsorption period to a desorption period, occurs only after a predetermined timelag. This is accomplished by means of an actuating means which functions also as a retardation means, for example, as shown in FIG. 3. It is noted that this is a matter of advantageous form of construction for the invention, although other forms of the invention may comprise retardation means of different designs.

Referring to FIG. 3, the control for the switchover valves 4 and 9 respectively (FIG. 1) are operated by means of motors 30 and 31 respectively. This circuitry can also be used in a similar way for the apparatus shown in FIG. 2, wherein the valves 15 and 16 are substituted for the valves 4 and 9.

The control circuit is adapted to be connected to either an AC source or to a DC source, and contains an attraction retarded timing relay 32 and a relay 33 not having attraction-retardation. The timing relay 32 can be actuated, as is known, for example, mechanically by a magnet with a retarding mechanism, or thermally with a bimetallic element, or electrically by electromagnetic retardation, for example, with capacitive (RC) elements through the intermediary of auxiliary relays. The switches actuated by the relays are designated 32a, 32b and 33a and 33b respectively. By the opening or the closing of the switches, the valve plug is turned by 90°, either clockwise or counterclockwise. The relay control circuit is switched in or out through the intermediary of a control switch 34.

In use, operation of the relays 32 and 33 initially causes the positioning motor 30, and after a certain interval of time the positioning motor 31 to be switched in, and thus the valve 4 (or 15) becomes switched over immediately, and after a delay the valve 9 (or 16) also becomes switchover. Thus, these valves first move through a zero position, so that a mixing of gas mixture and of desorption gas inside the valve is prevented.

One specific mode of operation of the apparatus of FIG. 1, for example, for washing carbon dioxide out of the storeroom air in a storeroom for fruit or the like, while using fresh air as a desorption medium will be explained to further point out the invention.

In order to initiate an adsorption period, following a preceding desorption period, the valve 4 is initially brought into the position shown in the drawing by the aid of the relay 33 and the positioning motor 30, so that the storeroom air of a storeroom (not shown) is forwarded by the blower 3 into the adsorption container 1. Valve 9 at this point of time is still in the position indicated by the dotted lines. Thus, the storeroom air forces the volume of fresh air still remaining from the preceding desorption period in the empty volume of he apparatus through the outflow conduit 12 and into the atmosphere. That is, the air in the conduits 2 and 8 and also in the adsorption container between the sieve 1a and the container bottom and between the sieve 1b and the container top and in the unoccupied spaces between the granules of the desorption medium, which air is enriched with carbon dioxide and has an oxygen content of about 20.8 percent is driven out of the system through conduit 12. As soon as the storeroom air has reached the valve 9, the valve 9 switches over into the position shown by the solid lines under the influence of the timelag circuitry of FIG. 3. Thereafter, only storeroom air that has been reduced to a desired percentage, 0.5 percent for example, of carbon dioxide, flows from the adsorption container through the conduit 11 back again into the storeroom. At the end of an adsorption period of, for example, of some minutes, the absorption medium is regenerated. In order to regenerate, valve 4 is switched over through the intermediary of the relay 33 and the motor 30 so that the inflow conduit 6 for fresh air becomes connected with the conduit 2, while valve 9 initially remains in its former position. Fresh air, which can be heated by the electric heating device 7, especially air having considerable relative humidity, is thus forwarded by the blower 3 into the adsorption container 1 to force the storeroom air situated in the empty volumes through the conduit 11 into the storeroom. It is only when the fresh air in the container 1 that removes carbon dioxide from the adsorption medium has reached the valve 9 by the aid of the timing relay 32 and the motor 31, becomes switched over to the outflow conduit 12. As a result, the fresh air laden with carbon dioxide is then able to flow out into the atmosphere, while the return line 11 from the adsorption container 1 is closed.

The length of time by which the switchover of valve 9 is delayed relatively to the switchover of valve 4 can be determined either experimentally, for example, by the aid of a smoke test, or can be computed by the aid of the empty volume of the adsorption container and the volumes of the inflow and outflow conduits, as well as of the blower performance.

With the illustrated examples of carrying out the invention, the gas mixture and the desorption gas respectively are conducted from the bottom upward through the adsorption container. Alternatively, the gas mixture and the desorption gas can be conveyed, respectively, from the top downward through the adsorption container.

What I claim is:

1. A process for adsorbing at least one gaseous component from a gas mixture in an enclosed room comprising the steps of
    passing the gas mixture from the enclosed room into an apparatus having a solid adsorption medium therein during an adsorption period to initially force out desorption medium from the apparatus into the atmosphere outside the enclosed room;
    thereafter passing the gas mixture back into the enclosed space while adsorbing the gaseous component from the gas mixture during passage through the adsorption medium;
    subsequently passing a gaseous desorption medium into the apparatus having the solid adsorption medium therein during a regeneration period to initially force out the treated gas mixture remaining in the apparatus into the enclosed room; and
    thereafter passing the desorption medium out of the apparatus into the atmosphere outside the enclosed room.

2. A process as set forth in claim 1 wherein said adsorption period and said regeneration period are repeated in sequence.

3. A process as set forth in claim 1 which further comprises the step of at least intermittently heating the desorption medium prior to passing into the solid adsorption medium.

4. A process as set forth in claim 1 wherein the gaseous component is carbon dioxide, the gas mixture is air from a storeroom containing fruit and vegetation, and the desorption medium is fresh air.

5. An apparatus for adsorbing at least one gaseous component from a gas mixture in an enclosed room comprising
    at least one adsorption means having an absorption medium for adsorbing the gaseous component from the gas mixture;
    a first inflow conduit connected to said means for passing the gas mixture from an enclosed room into said means;
    a second inflow conduit connected to said means for passing a gaseous desorption medium into said means;
    a first switchover valve connected to said first and second inflow conduits and to said means for selectively communicating one of said conduits to said means;
    a first outflow conduit connected to said means for returning the gas mixture into the enclosed room;
    a second outflow conduit connected to said means for passing the gaseous desorption medium from said means to atmosphere outside the enclosed room;
    a second switchover valve connected to said first and second outflow conduits and to said means for selectively communicating one of said outflow conduits to said means;
    at least one blower for forcing the gas mixture and desorption medium through said means; and
    retardation means connected to said valves to sequentially switchover said second valve from one of said outflow conduits to the other of said outflow conduits with a predetermined timelag after said first valve is switched over from one of said inflow conduits to the other of said inflow conduits.

6. An apparatus as set forth in claim 5 further comprising a pair of adsorption means connected in parallel between said valves whereby said means alternately adsorb the gaseous component from the gas mixture and regenerate the adsorption medium in alternating sequence.

7. An apparatus as set forth in claim 5 wherein said retardation means is an electrical retardation means.

8. An apparatus as set forth in claim 5 wherein said retardation means is a pneumatic retardation means.

9. An apparatus as set forth in claim 5 wherein said retardation means is a mechanical retardation means.

10. An apparatus as set forth in claim 5 wherein said retardation means is a hydraulic retardation means.

11. An apparatus as set forth in claim 5 wherein said adsorption medium is active carbon.

12. An apparatus as set forth in claim 5 wherein said absorption medium is zeolite.